US005883208A

United States Patent [19]
Deviny

[11] Patent Number: 5,883,208
[45] Date of Patent: Mar. 16, 1999

[54] INITIATOR SYSTEM AND ADHESIVE COMPOSITION MADE THEREWITH

[75] Inventor: E. John Deviny, Roseville, Minn.

[73] Assignee: Minnesota Mining and Manufacutring Company, St. Paul, Minn.

[21] Appl. No.: 746,507

[22] Filed: Nov. 8, 1996

Related U.S. Application Data

[63] Continuation of Ser. No. 554,883, Nov. 7, 1995, abandoned.

[51] Int. Cl.$^6$ .................................. C08F 4/52; C08F 4/54; B01J 31/00
[52] U.S. Cl. ...................... 526/198; 526/328; 427/335; 502/167; 502/200; 502/202
[58] Field of Search ................................. 502/167, 200, 502/202; 526/198, 328; 427/335

[56] References Cited

U.S. PATENT DOCUMENTS

| | | | |
|---|---|---|---|
| 2,985,633 | 5/1961 | Welch et al. | 260/85.3 |
| 3,141,862 | 7/1964 | Kirshenbaum et al. | 260/45.5 |
| 3,275,611 | 9/1966 | Mottus et al. | 260/80.5 |
| 3,340,193 | 9/1967 | Fields et al. | 252/56 |
| 3,418,260 | 12/1968 | Trofimenko | 260/2 |
| 3,425,988 | 2/1969 | German et al. | 260/47 |
| 3,451,952 | 6/1969 | Slocombe | 260/2.5 |
| 3,476,727 | 11/1969 | Monaco et al. | 260/92.8 |
| 3,527,737 | 9/1970 | Masuhara et al. | 260/78.5 |
| 3,829,973 | 8/1974 | Masuhara et al. | 32/15 |
| 4,167,616 | 9/1979 | Bollinger | 526/197 |
| 4,379,728 | 4/1983 | Lin | 156/307.3 |
| 4,485,229 | 11/1984 | Waddill et al. | 528/111 |
| 4,515,724 | 5/1985 | Ritter | 260/410 |
| 4,524,181 | 6/1985 | Adam et al. | 525/107 |
| 4,638,092 | 1/1987 | Ritter | 568/1 |
| 4,639,498 | 1/1987 | Ritter . | |
| 4,656,229 | 4/1987 | Chiao | 525/518 |
| 4,676,858 | 6/1987 | Ritter | 156/307.3 |
| 4,684,538 | 8/1987 | Klemarczyk | 427/54.1 |
| 4,721,751 | 1/1988 | Schappert et al. | 524/773 |
| 4,731,416 | 3/1988 | Saunders | 525/131 |
| 4,775,734 | 10/1988 | Goel | 528/89 |
| 4,874,814 | 10/1989 | Cariter et al. | 525/61 |
| 4,904,360 | 2/1990 | Wilson, Jr. et al. | 204/181.7 |
| 4,920,188 | 4/1990 | Sakashita et al. | 526/196 |
| 4,921,921 | 5/1990 | Ritter | 526/195 |
| 4,985,516 | 1/1991 | Sakashita et al. | 526/196 |
| 5,021,507 | 6/1991 | Stanley et al. | 525/127 |
| 5,106,928 | 4/1992 | Skoultchi et al. . | |
| 5,143,884 | 9/1992 | Skoultchi et al. . | |
| 5,286,821 | 2/1994 | Skoultchi | 526/196 |
| 5,310,835 | 5/1994 | Skoultchi et al. . | |
| 5,376,746 | 12/1994 | Skoultchi | 526/196 |
| 5,401,805 | 3/1995 | Chung et al. | 525/288 |
| 5,539,070 | 7/1996 | Zharov et al. | 526/198 |

FOREIGN PATENT DOCUMENTS

| | | | |
|---|---|---|---|
| 649582 | 10/1993 | Australia | C09J 133/08 |
| 664459 | 6/1963 | Canada | 401/104 |
| 2061021 | 10/1992 | Canada . | |
| 0 051 796 | 10/1981 | European Pat. Off. | C09J 3/14 |
| 0 511 464 A1 | 11/1992 | European Pat. Off. | C09J 4/00 |
| 42-14318 | of 0000 | Japan . | |
| 45-29195 | 9/1970 | Japan . | |
| 48-18928 | 6/1973 | Japan | C09J 5/00 |
| jp 53-102394 | 9/1978 | Japan | C08F 4/40 |
| 62-288675 | 12/1987 | Japan | C09J 3/14 |
| 3-177470 | 8/1991 | Japan . | |
| 3-264509 | 11/1991 | Japan | A61K 6/00 |
| 93-235089 | 9/1993 | Japan | A61K 6/00 |
| 904403 | 8/1962 | United Kingdom . | |
| 988632 | 4/1965 | United Kingdom . | |
| 113722 | 5/1968 | United Kingdom . | |
| 1132261 | 10/1968 | United Kingdom . | |

OTHER PUBLICATIONS

Official Gazette 1046–TMOG–2—Sep. 4, 1984.
1994:247566 (120:247566) "Chemical processing of wood using the functional groups introduced by the oxidation and the esterification" Kurosu et al.
Baiomasu Henkan Keikaku Kenkyu Hokoku (1991), 29, 33–52 Journal.
The Trialkylborane–initiated Graft Copolymerization of Methyl Methacrylate onto Hemoglobin, K. Kojima, S. Iwabuchi and K. Kojima, *Bulletin of the Chemical Society of Japan*, vol. 44, pp. 1891–1895 (1971).
A New Method for the Graft Copolyermerization of Methyl Methacrylate onto Proteins and Fibers, *Polymer Letters*, vol. 9, pp. 25–29 (1971).
The Grafting of Methyl Methacrylate onto Cotton by Tri–n–butylborane, K. Kojima, S. Iwabuchi, K. Murakami, K. Kojima and F. Ichikawa, *Journal of Applied Polymer Science*, vol. 16, pp. 1139–1148 (1972).
Grafting of Vinyl Monomers by Tri–n–Butylborane onto Chlorophyll and Related Compounds, *Polymer Letters Edition*, vol. 13, pp. 361–363 (1975).
Tributylborane–Initiated Grafting of Methyl Methacrylate onto Chitin, K. Kojima, M. Yoshikuni and T. Suzuki, *Journal of Applied Polymer Science*, vol. 24, pp. 1587–1593 (1979).
Grafting of Methyl Methacrylate onto Silk Fibers Initiated by Tri–n–Butylborane, M. Tsukada, T. Yamamoto, N. Nakabayashi, H. Ishikawa and G. Freddi, *Journal of Applied Polymer Science*, vol. 43, pp. 2115–2121 (1991).

(List continued on next page.)

*Primary Examiner*—Bernard Lipman
*Assistant Examiner*—N. Sarofim
*Attorney, Agent, or Firm*—Steven E. Skolnick

[57] ABSTRACT

Systems for initiating the polymerization of acrylic monomers comprising (1) organoborane amine complexes and (2) decomplexers comprising at least one anhydride group. Adhesive compositions prepared from the initiator systems advantageously exhibit low levels of mobile constituents, excellent solvent resistance, and good adhesion to low energy surfaces.

39 Claims, No Drawings

OTHER PUBLICATIONS

Molecular Weight Distribution of the Methyl Methacrylate (MMA) Polymer Separated from the MMA–Grafted Silk Fiber, M. Tsukada, Y. Goto, G. Freddi, T. Yamamoto and N. Nakabayashi, *Journal of Applied Polymer Science*, vol. 44, pp. 2197–2202 (1992).

Synthesis of Functionalized Polypropylene and Polypropylene–Polymethylmethacrylate Graft Copolymer, D. Rhubright and T.C. Chung, Proceedings of the American Chemical Society, *Polymeric Materials Science and Engineering*, vol. 67, pp. 112–113 (1992).

Polymerization of Acrylonitrile in Presence of Tributylborine, G. Kolesnikov and L. Fedorova, translated from *Bull. Acad. Sci. Ussr, Div. Chem. Sci.*, p. 236 (1957).

Tributylborine: A Catalyst for the Polyermization of Unsaturated Compounds, G. Kolesnikov and N.V. Klimentova, translated from *Bull. Acad. Sci. USSR, Div. Chem. Sci.*, p. 653 (1957).

Triethylboron as an Initiator for Vinyl Polymerization, J. Furukawa, T. Tsuruta and S. Inoue, *Journal of Polymer Science*, vol. XXVI, Issue No. 113, pp. 234–236 (1957).

Oxygen Compounds as Cocatalyst for Triethylboron–Catalyzed Vinyl Polymerization, J. Furukawa and T. Tsuruta, *Journal of Polymer Science*, vol. XXVIII, Issue No. 116, pp. 227–229 (1958).

Mechanism of the Polymerization of Acrylonitrile in Presence of Tributylborine, G. Kolesnikov and L. Fedorova, translated from *Bull. Acad. Sci. USSR, Div. Chem. Sci.*, p. 906 (1958).

Mechanism of Trialkylboron Initiated Polymerization, J. Fordham and C. Sturm, *Journal of Polymer Science*, vol. XXXIII, No. 126, pp. 503–504 (1958).

Cocatalytic Activity of Some Metal Salts on Vinyl Polmerization with Tributhylboron, I. M. Panayotov, *Comptes rendus de l'Academie bulgare des Sciences*, vol. 14, No. 2, pp. 147–150 (1961).

Polymerization with Organoboron Compounds, F. Arimoto, *Journal of Polymer Science: Part A–1*, vol. 4, pp. 275–282 (1966).

Vinyl Monomer Polymerization Mechanism in the Presence of Trialkylboranes, J. Grotewold, E. Lissi and A. Villa, *Journal of Polymer Science: Part A–1*, vol. 6, pp. 3157–3162 (1968).

Free–Radical Polymerization of Methyl Methacrylate in the Presence of Trialkylboranes, P. Brindley and R. Pearson, *Polymer Letters*, vol. 6, pp. 831–835 (1968).

Ethylene Polymerization in Presence of Tributylboron, G. Kolesnikov and T. Soboleva, *Scientific and Research Publications of the Members of the All Union Chemical Society Name After Mendilev*, vol. 2, p. 663 (1957).

Free–Radical Copolymerization of 1,2–Dichloroethylenes. Evidence for Chain Transfer by Chlorine Atom Elimination, T. Dawson, R. Lundberg and F. Welch, *Journal of Polymer Science: Part A–1*, vol. 7, pp. 173–181 (1969).

Mechanism of Vinyl Monomer Polymerization in the Presence of Trialkylboranes and Inhibitors, E. Aranchibia et al., *Journal of Polymer Science: Part A–1*, vol. 7, pp. 3430–3433 (1969).

Polymerization Initiated by Triethylborane–Peroxide Mixtures, E. Abuin et al., *Polymer Letters*, vol. 7, pp. 515–518 (1970).

Polymerization of Methyl Methacrylate Initiated by Tri–n–butylborane–Organic Halide Systems, M. Yoshikuni, M. Asami, S. Iwabuchi and K. Kojima, *Journal of Polymer Science*, vol. 11, pp. 3115–3124 (1973).

Polymerization of Methyl Methacrylate Initiated by Tributylborane–Pyridine System, Kojima et al., *Journal of the Japanese Chemical Society*, No. 11, pp. 2165–2171 (1972).

The Copolymerization of Vinylhydroquinone and Acrylonitrile by Tri–n–butylborane, S. Iwabuchi, M. Ueda, M. Kobayashi and K. Kojima, *Polymer Journal*, vol. 6, No. 2, pp. 185–190 (1974).

Free Radical Polymerization in the Presence of Triethylborane, E. Abuin, J. Cornejo and E. Lissi, *European Polymer Journal*, vol. 11, pp. 779–782 (1975).

Polymerization of Methyl Methacrylate by tri–n–butylborane in the presence of amino acid esters, K. Kojima, S. Iwabuchi, Y. Moriya and M. Yoshikuni, *Polymer*, vol. 16, pp. 601–604 (1975).

Analysis of Mechanism of Radical Formation Resulted from the Initiator System of Triethylboron and Oxygen by Spin Trapping Technique, Sato et al., *Journal of the Japanese Chemical Society*, No. 6, pp. 1080–1084 (1975).

Development of Adhesive Pit and Fissure Sealants Using a MMA Resin Initiated by a Tri–n–butyl Borane Derivative, N. Nakabayashi and E. Masuhara, *Journal of Biomedical Materials Research*, vol. 12, pp. 149–165 (1978).

Vinyl Acetate Polymerization Initiated by Alkylborane–oxidizer–type Systems, S. Ivanchev, L. Shumnyi and V. Konovalenko, *Polymer Science U.S.S.R.*, vol. 22, No. 12, pp. 8000–8006 (1980).

Preparation of Hard Tissue Compatible Materials: Dental Polymers, N. Nakabayashi and E. Masuhara, *Biomedical Polymers*, pp. 85–111 (1980).

Mechanism of Initiation of Polymerization of Vinyl Monomers by Means of the Trialkylborane–Acid System, S. Ivanchev and L. Shumnyi, translated from Doklady Akademii Nauk SSSR, vol. 270, No. 5, pp. 1127–1129 (1983).

Effect of Organic Bases on Initiating Properties in the System Boronalkylelemental Organic Peroxide During Vinylchloride Polymerization, T. Guzanova, Master Thesis of the Fifth (graduate) year student, Ministry of High and Secondary Special Education Russia, Gorky State University(1983).

Application of Spin Trapping Technique to Radical Polymerization, 20, T. Sato, N. Fukumura and T. Otsu, *Makromol. Chem.*, 184, pp. 431–442 (1983).

Importance of Polymerization Initiator Systems and Interfacial Initiation of Polymerization in Adhesive Bonding of Resin to Dentin, Y. Imai, Y. Kadoma, K. Kojima, T. Akimoto, K. Ikakura and T. Ohta, *J. Dent. Res.*, vol. 70, No. 7, pp. 1088–1091 (1991).

Vibrational Analysis by Raman Spectroscopy of the Interface Between Dental Adhesive Resin and Dentin, M. Suzuki, H. Kato and S. Wakumoto, *J. Dent. Res.*, vol. 70, No. 7, pp. 1092–1097 (1991).

Laser–Raman Spectroscopic Study of the Adhesive Interface Between 4–MER/MMA–TBB Resin and Hydroxyapatite or Bovine Enamel, M. Ozaki, M. Suzuki, K. Itoh and S. Wakumoto, *Dental Materials Journal*, vol. 10, No. 2, pp. 105–120 (1991).

Polymerization of Some Vinyl Monomers on Triisobutylboron–Containing Radical Initiators in the Presence of Hydroquinone and Benzoquinone, V. Dodonov and D. Grishin, *High Molecular Compounds*, vol. 35, No. 3, pp. 137–141 (1993).

Synthesis of PP–g–PMMA, PP–g–PVA and PP–g–PCL Copolymers, D. Rhubright and T. Chung, American Chemical Society, Division of Polymer Chemistry, Papers Presented at the Chicago, Illinois Meeting, vol. 34, No. 2, pp. 560–561 (1993).

Functionalized and Grafted Polyolefin Copolymers Prepared by Tansition Metal Catalysts and Borane Monomers, T. Chung, *Polymer Reprints*, vol. 35, No. 1, pp. 674–675 (1994).

Photochemical Modification of Fluorocargon Resin Surface to Adhere with Epoxy Resin, M. Okoshi, T. Miyokawa, H. Kashiura and M. Murahara, *Mat. Res. Soc. Symp. Proc.*, vol. 334, pp. 365–371 (1994).

Chemical Abstract No. 88532r, *Chemical Abstracts*, vol. 73, 1970.

Chemical Abstract No. 134385q, *Chemical Abstracts*, vol. 80, 1974.

Reports of the Institute for Medical and Dental Engineering, "Studies on Dental Self–Curing Resins" vol. 3, pp. 64–71(1969).

Polymer Letters, "Polymerization of Methyl Methacrylate by Trialkylborane–Pyridine System", vol. 8, pp. 541–547 (1970).

Polymer Letters, "On The Existence of a Free–Radical Organoboron Complex in The Polymerization of Methyl Methacrylate", vol. 5, pp. 157–162(1967).

"Polymerization of vinyl compounds", JP 71016888, Abstract.

"Polymerization of Methyl Methacrylate by Co–ordination Compounds of Tri–n–butylborane with Some Electron–donating Compounds", Kojima et al., UDC 547.25, pp. 47–55.

INITIATOR SYSTEM AND ADHESIVE COMPOSITION MADE THEREWITH

This is a continuation of application Ser. No. 08/554,883 filed Nov. 7, 1995, now abandoned.

FIELD OF THE INVENTION

This invention relates generally to systems capable of initiating the polymerization of acrylic monomers. More specifically, the invention relates to those initiator systems comprising (1) organoborane amine complexes and (2) decomplexers comprising at least one anhydride group. The invention further relates to the use of these systems for initiating the polymerization of acrylic monomers, as well as acrylic adhesive compositions made therewith. Adhesive compositions having low levels of mobile constituents, excellent solvent resistance, and good adhesion to low energy surfaces are advantageously provided.

DESCRIPTION OF THE RELATED ART

Systems for initiating the polymerization of acrylic monomers to make adhesive compositions are known in the art. U.S. Pat. Nos. 5,106,928, 5,286,821, and 5,310,835, for example, disclose a two part initiator system that is reportedly useful in acrylic adhesive compositions. The first part of this two part system includes a stable organoborane amine complex and the second part includes an activator. The activator liberates the organoborane compound by removing the amine group, thereby allowing the organoborane compound to initiate the polymerization process. Activators are also sometimes referred to as liberators or decomplexers.

The organoborane compound of the complex has the general formula:

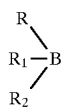

where R, $R_1$ and $R_2$ are either alkyl groups having 1 to 10 carbon atoms or phenyl groups. Useful amine compounds for the complex include n-octylamine, 1,6-diaminohexane, diethylamine, dibutylamine, diethylenetriamine, dipropylenediamine, ammonia, 1,3-propylenediamine, and 1,2-propylenediamine.

U.S. Pat. No. 5,286,821 reports that suitable activators for liberating the organoborane compound include aldehydes having the general structure:

wherein R is alkyl of 1 to 10 carbon atoms or aryl having 6 to 10 carbon atoms and x is 1 to 2. Examples include benzaldehyde, o-, m-, p-nitrobenzaldehyde, 2,4-dichlorobenzaldehyde, p-tolylaldehyde, and 3-methoxy-4 hydroxybenzaldehyde.

U.S. Pat. Nos. 5,310,835 and 5,106,928 reports that suitable activators also include organic acids having the structure:

wherein R is H, alkyl, or alkenyl having 1 to 8 carbon atoms. Examples include acrylic acid, methacrylic acid, benzoic acid, and p-methoxybenzoic acid.

Fujisawa, Imai, and Mashuhara also describe a system for initiating the polymerization of methyl methacrylate. See *Reports of the Institute for Medical and Dental Engineering*, 3, 64 (1969). The system comprises a trialkylborane amine complex and an activator such as the chloride of methacrylic or n-butane sulfonic acid, terephtalic acid chloride, benzoyl chloride, p-toluene sulfonic acid chloride, benzene sulfonic acid chloride, methane sulfonic acid chloride, toluene diisocyanate, adipic acid chloride, o-tolyl isocyanate, acetyl chloride, and anhydrous acetic acid. The initiator system is reportedly useful in providing fast curing resins for dental applications.

Activators (sometimes also referred to as decomplexers) liberate the organoborane compound by bonding (either covalently or ionically) to the amine to form an activator-amine constituent. Most activator-amine constituents remain in the adhesive composition as a mobile constituent that is not incorporated into the polymerized adhesive per se. In general, mobile constituents in adhesive compositions may cause performance problems when, for example, they migrate to the surface of the adhesive thereby disrupting the bond interface. Mobile constituents are also susceptible to attack by solvents, thereby making the adhesive composition less suitable for applications where exposure to solvents is unavoidable.

A need exists for initiator systems which provide acrylic adhesive compositions having reduced levels of mobile constituents and improved solvent resistance. Such adhesives are less susceptible to performance problems due to migration of mobile constituents to the bond interface and can also be used in various manufacturing applications where adhesives are exposed to organic vapors, oils, fuels, and other solvents such as methylethylketone, tetrahydrofuran, and the like.

SUMMARY OF THE INVENTION

This invention provides systems capable of initiating the polymerization of acrylic monomers. More specifically, the invention provides initiator systems comprising (1) an organoborane amine complex and (2) a decomplexer comprising at least one anhydride group. The term "decomplexer" means a compound capable of liberating the organoborane compound, thereby allowing the organoborane to initiate the polymerization process. Decomplexers are also sometimes referred to as "activators" or "liberators." As used herein, each of these terms has the same meaning. In the present invention, the anhydride group of the decomplexer is capable of forming a covalent bond with the amine portion of the organoborane amine complex to liberate the organoborane compound.

The decomplexer of the invention comprises at least one anhydride group. Preferably, the anhydride has one of the following structures:

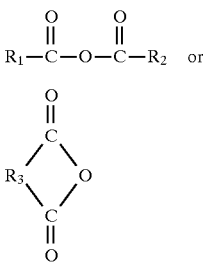

Each of the $R_1$ and $R_2$ groups may independently be an aliphatic group (i.e., a straight- or branched-chain arrangement of carbon atoms falling into one of three subgroups, namely, alkane, alkene and alkyne groups); a cycloaliphatic group (i.e., a non-aromatic cyclic hydrocarbon structure); or an aromatic group (i.e., a cyclic hydrocarbon structure that is fully unsaturated). Of these three, aliphatic and aromatic groups are preferred. Preferred aliphatic groups comprise 1 to 17 carbon atoms, more preferably 2 to 9 carbon atoms. Preferred aromatic groups include benzene and benzene substituted with aliphatic groups comprising 1 to 4 carbon atoms.

$R_3$ is a divalent organic radical that completes a cyclic structure with the anhydride group to form, for example, a 5 or 6 member ring. The term "divalent organic radical" means an organic moiety wherein the available valencies are on carbon atoms. $R_3$ may be substituted with aliphatic, cycloaliphatic or aromatic groups, preferably aliphatic groups comprising 1 to 12, more preferably 1 to 4, carbon atoms. $R_3$ may also contain a heteroatom such as oxygen or nitrogen with the proviso that the heteroatom is not adjacent to the anhydride functionality. $R_3$ may also be part of a fused ring structure. The fused ring structure may be cycloaliphatic or aromatic. The term "aromatic" in reference to a fused ring structure means that at least one carbonyl group is attached to an aromatic group. The term "cycloaliphatic" is intended to include all other non-aromatic fused ring structures. The fused ring may further be substituted with aliphatic groups, preferably those groups having 1 to 4 carbon atoms, most preferably 1 carbon atom.

The organoborane amine complex of the system of the invention comprises an amine portion and an organoborane portion. The amine portion of the complex may comprise one or more amine groups. The anhydride group of the decomplexer reacts with the amine portion of the organoborane amine complex to form a decomplexer-amine reaction product. The organoborane is thereby liberated whereupon it is capable of initiating polymerization of the acrylic monomer(s).

Preferably, the decomplexer comprises at least one free radically polymerizable group that is capable of forming a covalent bond with acrylic monomer. In this case, the decomplexer-amine reaction product is capable of forming covalent bonds with acrylic monomer(s) and can be incorporated into the polymerized adhesive per se. This results in a reduced level of mobile constituents (i.e., those materials capable of migrating or diffusing through the cured adhesive).

Even more preferably, the decomplexer reacts with the amine portion of the organoborane amine complex to form a decomplexer-amine reaction product comprising more than one free radically polymerizable group. In this case, the decomplexer not only provides a reduced level of mobile constituents, but also provides polymerized adhesive compositions having good solvent resistance.

As stated previously, the system of the invention can be used to initiate the polymerization of acrylic monomer(s). Consequently, the invention also relates to a polymerizable acrylic composition that comprises at least one acrylic monomer, an effective amount of an organoborane amine complex, and an effective amount of the decomplexer of the invention for liberating the organoborane to initiate polymerization of the at least one acrylic monomer.

A wide variety of acrylic monomers may be used, for example, monofunctional acrylate ester, monofunctional methacrylate ester, substituted derivatives of the foregoing, and blends of the foregoing.

Acrylic compositions of the invention are uniquely useful in providing adhesives, and adhesive compositions of the invention advantageously provide reduced levels of mobile constituents, excellent solvent resistance, and adhesion to low surface energy plastics such as polyethylene and polytetrafluroethylene. The term "low energy surface" means those materials having a surface energy of less than 45 mJ/m$^2$, more typically less than about 35–40 mJ/m$^2$.

In another aspect, the invention relates to a method of initiating the polymerization of an acrylic monomer, the method comprising the steps of providing at least one acrylic monomer, blending the at least one acrylic monomer with the components of the polymerization initiator system according to the invention, and initiating polymerization of the at least one acrylic monomer. As indicated above, a decomplexer-amine reaction product is formed when the decomplexer is combined with the organoborane amine complex. When the decomplexer-amine reaction product comprises at least one free radically polymerizable group capable of forming a covalent bond with acrylic monomer, polymerized acrylic compositions having a reduced level of mobile constituents are advantageously provided. Furthermore, when the decomplexer-amine reaction product comprises more than one free radically polymerizable group, this method may be used to prepare a polymerized adhesive composition having improved solvent resistance.

DETAILED DESCRIPTION OF THE PREFERRED EMBODIMENTS

Decomplexer

The decomplexer of the invention comprises at least one anhydride group. Preferably, the anhydride has one of the following structures:

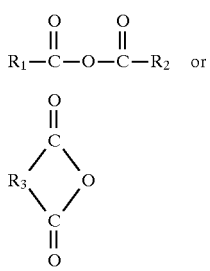

Each of the $R_1$ and $R_2$ groups may independently be an aliphatic group (i.e., a straight- or branched-chain arrangement of carbon atoms falling into one of three subgroups, namely, alkane, alkene and alkyne groups); a cycloaliphatic group (i.e., a non-aromatic cyclic hydrocarbon structure); or an aromatic group (i.e., a cyclic hydrocarbon structure that is fully unsaturated). Of these three, aliphatic and aromatic groups are preferred. Preferred aliphatic groups comprise 1 to 17 carbon atoms, more preferably 2 to 9 carbon atoms. Preferred aromatic groups include benzene and benzene substituted with aliphatic groups comprising 1 to 4 carbon atoms.

$R_3$ is a divalent organic radical that completes a cyclic structure with the anhydride group. The term "divalent organic radical" means an organic moiety wherein the available valencies are on carbon atoms. The cyclic structure may comprise, for example, a 5 or 6 member ring. $R_3$ may be substituted with aliphatic, cycloaliphatic or aromatic groups, preferably aliphatic groups comprising 1 to 12, more preferably 1 to 4, carbon atoms. $R_3$ may also contain a heteroatom such as oxygen or nitrogen. $R_3$ may also be part of a fused ring structure. The fused ring structure may be cycloaliphatic or aromatic. The term "aromatic" in reference to a fused ring structure means that at least one carbonyl group is attached to an aromatic group. The term "cycloaliphatic" is intended to include all other non-aromatic fused ring structures. The fused ring may further be substituted with aliphatic groups, preferably those groups having 1 to 4 carbon atoms, most preferably 1 carbon atom.

Examples of useful anhydrides include propionic anhydride, methacrylic anhydride, crotonic anhydride, butyric anhydride, isobutyric anhydride, valeric anhydride, trimethylacetic anhydride, hexanoic anhydride, heptanoic anhydride, decanoic anhydride, lauric anhydride, stearic anhydride, oleic anhydride, benzoic anhydride, succinic anhydride, methylsuccinic anhydride, isobutenylsuccinic anhydride, 2,2-dimethylsuccinic anhydride, itaconic anhydride, maleic anhydride, citraconic anhydride, 2,3-dimethylmaleic anhydride, 2-octen-1-ylsuccinic anhydride, 2-dodecen-1-ylsuccinic anhydride, glutaric anhydride, 3-methylglutaric anhydride, 3,3-dimethylglutaric anhydride, 3-ethyl-3-methylglutaric anhydride, 2-phenylglutaric anhydride, diglycolic anhydride, ethylenediaminetetraacetic dianhydride, and poly(styrene-co-maleic anhydride), cyclohexanedicarboxylic anhydride, cis-1,2,3,6-tetrahydrophthalic anhydride, hexahydro-4-methylphthalic anhydride, cis-5-norbomene-endo-2,3-dicarboxylic anhydride, methyl-5-norbornene-2,3-dicarboxylic anhydride, exo-3,6-epoxy-1,2,3,6-tetrahydrophthalic anhydride, 3,3-tetramethyleneglutaric anhydride, phthalic anhydride, 4-methylphthalic anhydride, 1,8-naphthalic anhydride, diphenic anhydride, and homophthalic anhydride. These materials are commercially available from a variety of sources.

Further examples of useful anhydrides include the partial adducts of active hydrogen compounds (such as hydroxyl, amine and thiol compounds) with polyanhydrides (i.e., compounds having at least two anhydride groups such as ethylenediaminetetraacetic dianhydride and poly(styrene-co-maleic anhydride)). The term "partial adduct" means that the resulting adduct retains at least one anhydride group after reaction with the active hydrogen containing compound. Examples of hydroxyl compounds useful for preparing the partial adducts include aliphatic alcohols such as methanol, ethanol, propanol, and butanol; higher alkane alcohols such as hexanol and octanol; ether alcohols such as 2-methoxyethanol, 2-(2-propoxy)ethanol, 2-butoxyethanol, and 2-ethoxyethanol; and alicyclic alcohols such as cyclohexylmethanol. Other hydroxyl compounds which may be used include those having the following structure:

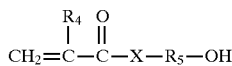

wherein $R_4$ is hydrogen, methyl, ethyl or chlorine; $R_5$ is an alkyl group preferably having 2 to 16 carbon atoms; and X is oxygen or $NR_6$ wherein $R_6$ is hydrogen or an alkyl group preferably having 1 to 4 carbon atoms. More preferably, $R_4$ is hydrogen or methyl, $R_5$ is an alkyl group having 2 to 4 carbon atoms, and X is oxygen.

Still other active hydrogen containing compounds useful for preparing the partial adducts of the invention include the adducts of the above-mentioned hydroxylated (meth) acrylates with lactones. The adducts, hydroxyacrylate polyesters, may be represented by the following structure:

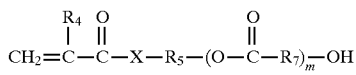

wherein $R_4$, $R_5$ and X are defined above, $R_7$ is an alkyl group preferably having 2 to 11 carbon atoms, and m is an integer greater than or equal to 1. More preferably, $R_4$ is hydrogen or methyl, $R_5$ is an alkyl group having 2 to 4 carbon atoms, X is oxygen, $R_7$ is an alkyl group having 3 to 5 carbon atoms, and m is an integer from 1 to 4.

Examples of amine compounds useful for preparing the partial adducts include aliphatic primary amines such as ethylamine, butylamine, hexylamine, and allylamine; aliphatic secondary amines such as diethylamine, dihexylamine, and N-methylbutylamine; aromatic primary amines such as aniline, the ortho-, meta- or para-toluidines, and xylylamines; and aromatic secondary amines such as n-alkyl anilines and toluidines. Examples of thiols include butanethiol; dodecyl mercaptan; esters of 3-mercaptopropionic acid such as isooctyl 3-mercaptopropionate; and esters of thioglycolic acid such as 2-ethylhexyl thioglycolate.

The partial adducts are typically prepared by first dissolving the polyanhydride in a solvent that is non-reactive with the polyanhydride and that provides a pourable medium for the subsequent dissolution of co-reactants. Examples of suitable solvents include butyl acetate, toluene, xylene, tetrahydrofuran, ethylene glycol dimethyl ether and the like. Preferably, the solvent is free radically polymerizable with acrylic monomer so that once the partial adduct is made, the solution of partial adduct in solvent can be used to prepare adhesives without the need for solvent removal. Examples of solvents which are free radically polymerizable with acrylic monomer include the esters of acrylic or methacrylic acid such as butyl methacrylate, ethoxyethyl methacrylate, benzyl methacrylate, and tetrahydrofurfuryl methacrylate.

After the polyanhydride is dissolved in a solvent, a free radical inhibitor (for example, a phenolic compound such as hydroquinone monomethylether or butylated hydroxytoluene) is typically added at a level of 300–600 parts by weight per million parts by weight partial adduct. After the addition of the free radical inhibitor, the active hydrogen containing compound is added. A molar excess of the anhydride groups is necessary to achieve anhydride functionality in the resulting partial adduct. Once the active hydrogen containing compound is added, the mixture is then typically heated for a length of time (for example, 80° C. to 110° C. for several hours). When the reaction is complete, the mixture is cooled. If a free radically polymerizable solvent was used to carry out the reaction, the solution (with solvent) may be used to prepare adhesive compositions. Otherwise, the solvent is typically removed using various evaporation methods known in the art.

Preferably, the decomplexer comprises at least one free radically polymerizable group that is capable of forming a covalent bond with acrylic monomer(s). In this case, the decomplexer-amine reaction product is capable of forming a covalent bond with acrylic monomer(s) and can be incorporated into the polymerized adhesive per se. This results in a reduced level of mobile constituents (i.e., those materials capable of migrating or diffusing through the cured adhesive).

Examples of polymerizable groups that may be present in the decomplexer of the invention include monosubstituted alkene groups, 1,1-disubstituted alkene groups, and 1,2-disubstituted alkene groups which are part of an α,β-unsaturated carbonyl structure. Examples of anhydrides that comprise such groups include itaconic anhydride, maleic anhydride, isobutenyl succinic anhydride, and methacrylic anhydride.

Even more preferably, the decomplexer reacts with the amine portion of the organoborane amine complex to form a decomplexer-amine reaction product comprising more than one free radically polymerizable group. In this case, the decomplexer not only provides a reduced level of mobile constituents, but also provides polymerized adhesive compositions having good solvent resistance. For example, the reaction of itaconic anhydride, maleic anhydride, isobutenyl succinic anhydride, or methacrylic anhydride with an organoborane amine complex comprising more than one amine group provides a decomplexer-amine reaction product comprising more than one free radically polymerizable group.

Organoborane Amine Complex

In general, complexes of the invention are complexes of organoborane and amine. Such complexes may be represented by the structure:

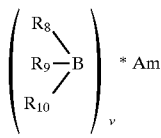

$R_8$ is an alkyl group having 1 to 10 carbon atoms. $R_9$ and $R_{10}$ are independently selected from alkyl groups having 1 to 10 carbon atoms and phenyl-containing groups. Preferably, $R_8$, $R_9$ and $R_{10}$ are independently selected alkyl groups having 1 to 5 carbon atoms. Most preferably, they are the same.

The value of v is selected so as to provide an effective ratio of primary or secondary amine nitrogen atoms to boron atoms in the complex. The ratio of primary or secondary amine nitrogen atoms to boron atoms in the complex should broadly be about 0.5:1 to 4:1.

The amine, Am, may comprise a variety of structures, for example, any primary or secondary amine, polyamine containing a primary or secondary amine, or ammonia. When solvent resistance in the ultimate polymerized acrylic composition is desired, Am preferably comprises a polyamine.

For example, Am may represented by the structure:

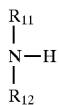

where $R_{11}$ and $R_{12}$ are hydrogen, alkyl of 1 to 10 carbon atoms, hydroxyethyl or

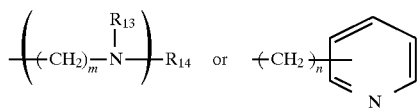

where $R_{13}$ and $R_{14}$ are hydrogen or alkyl of 1 to 10 carbon atoms, m is greater than 2, and n is 1 to 6. The alkyl groups in these formulae may comprise straight or branched chains. Illustrative compounds include n-octylamine, 1,6-diaminohexane, diethylamine, dibutylamine, dipropylenediamine, diethylenetriamine, ammonia, 1,3-propylenediamine, and 1,2-propylenediamine.

Alternatively, Am may be a polyoxyalkylenepolyamine having a structure such as $$H_2NR_{15}O{-}(R_{16}O)_w{-}(R_{17}O)_x{-}(R_{16}O)_y{-}R_{15}NH_2 \quad (I)$$

or $$[H_2NR_{15}O{-}(R_{16}O)_w]_z{-}R_{18} \quad (II)$$

$R_{15}$, $R_{16}$ and $R_{17}$ are preferably alkylene groups having 1 to 10 carbon atoms which may be the same or different. More preferably, $R_{15}$ is an alkyl group having 2 to 4 carbon atoms, $R_{16}$ is an alkyl group of 2 or 3 carbon atoms, and $R_{17}$ is an alkyl group of 2 or 3 carbon atoms. $R_{18}$ is a residue of a polyol used to prepare the polyoxyalkylenepolyamine (i.e., the organic structure that remains when the hydroxyl groups are removed). $R_{18}$ may be branched or linear, saturated or unsaturated, and substituted or unsubstituted.

The value of w is $\geq 1$ (more preferably about 1 to 150, and most preferably about 1 to 20). The value of x and y are $\geq 0$. The value of z is >2 (more preferably 3 or 4).

Examples of useful polyoxyalkylenepolyamines include polyethyleneoxidediamine, polypropyleneoxidediamine, diethyleneglycolpropylenediamine, triethyleneglycolpropylenediamine, polytetramethyleneoxidediamine, and polyethyleneoxide-co-polypropyleneoxidediamine.

Examples of useful commercially available polyoxyalkylenepolyamines include various JEFFAMINES from Huntsman Chemical Company such as the D, ED, EDR, and T series diamines (e.g., D-400, D-2000, D-5000, ED-600, ED-900, ED-2001, EDR-148 and T403), as well as DCA-221 from Dixie Chemical Company.

Alternatively, the amine, Am, may comprise the reaction product of one or more diprimary amine-terminated materials (i.e., the two terminal groups are primary amine) and one or more materials containing at least two groups reactive with the primary amine (the latter may be referred to as a "difunctional primary amine-reactive" material). In this case, Am may be represented by the structure:

$$E{-}(L{-}E)_q{-}L{-}E \quad (III)$$

in which each E group is the residue of the diprimary amine-terminated material and each L is a linking group that is the residue of the material having at least two groups reactive with primary amine. The term "residue" means those portions of the diprimary amine-terminated material and the difunctional primary amine-reactive material that remain after reaction to form the polyamine adduct. The integral value of q is $\geq 0$ (more preferably, it is from 0 to 5, and most preferably it is 0 or 1).

Useful diprimary amine-terminated materials (E) include alkyl diprimary amines, aryl diprimary amines, alkaryl diprimary amines, polyoxyalkylenediamines such as those represented by structure I described above, and mixtures thereof. A particularly preferred material for E is an aliphatic oxyalkylene diamine sold as DCA-221 from Dixie Chemical Company.

Suitable candidates for the material having at least two groups reactive with primary amine (L) may be represented by the general structure W—R—Z, wherein W and Z are moieties independently selected from the group consisting of carboxylic acid, carboxylic acid halide, ester, aldehyde, epoxide, amino alcohol, and acrylic, and R is a divalent organic radical. Most preferably W and Z are the same. A particularly preferred material for L is hexanedioldiacrylate.

Initiator System

The initiator systems of the invention are especially useful in polymerizing acrylic monomers, particularly for making polymerizable acrylic adhesives. The organoborane amine complex is employed in an effective amount, which is an amount large enough to permit polymerization to readily occur to obtain a polymer (preferably, an acrylic polymer) of high enough molecular weight for the desired end use. If the amount of organoborane amine complex is too low, then the polymerization may be incomplete or, in the case of adhesives, the resulting composition may have poor adhesion. On the other hand, if the amount of organoborane amine complex is too high, then the polymerization may proceed too rapidly to allow for effective mixing and use of the resulting composition. Large amounts of complex could also lead to the generation of large volumes of borane, which, in the case of an adhesive, could weaken the bondline. The useful rate of polymerization will depend in part on the method of applying the composition to a substrate. Thus, a faster rate of polymerization may be accommodated by using a high speed automated industrial adhesive applicator rather than by applying the composition with a hand applicator or by manually mixing the composition.

Within these parameters, an effective amount of the organoborane amine complex is an amount that preferably provides about 0.03 to 1.5 weight % boron, based on the total weight of the adhesive composition, more preferably about 0.06 to 0.60 weight % boron.

The weight % of boron in a composition is equal to the following:

$$\frac{\text{(weight of complex in the composition)} \times \text{(weight \% of boron in the complex)}}{\text{(Total weight of composition)}}$$

The organoborane decomplexer liberates organoborane by reacting with the amine, thereby removing the organoborane from chemical attachment with the amine.

The decomplexer is employed in an effective amount; that is, an amount effective to promote polymerization by liberating organoborane from the complex but without materially adversely affecting the properties of the ultimate polymerized composition. Larger amounts of decomplexer may permit the polymerization to proceed too quickly and, in the case of adhesives, the resulting materials may demonstrate inadequate adhesion to low energy surfaces. If small amounts of decomplexer are employed, the rate of polymerization may be too slow and the monomers that are being polymerized may not adequately increase in molecular weight. However, a reduced amount of decomplexer may be helpful in slowing the rate of polymerization if it is otherwise too fast.

Within these parameters, the decomplexer is typically provided in an amount such that the ratio of anhydride groups to amine groups is in the range of 0.5:1.0 to 1.0:1.0. The number of amine groups includes both primary and secondary amine groups if the amine is a polyamine.

Compositions

The initiator systems of the invention are useful in providing polymerizable acrylic monomer compositions. "Acrylic monomers" are polymerizable monomers having one or more acrylic or substituted acrylic moieties, chemical groups or functionality; that is, groups having the general structure

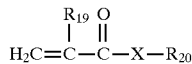

wherein $R_{19}$ and $R_{20}$ are hydrogen or organic radicals, and X is oxygen or $NR_{21}$ where $R_{21}$ is hydrogen or an alkyl group preferably having 1 to 4 carbon atoms. Where $R_{19}$ and $R_{20}$ are organic radicals, they may be the same or they may be different. Blends of acrylic monomers may also be used. The polymerizable acrylic monomer may be monofunctional, polyfunctional or a combination thereof.

The most useful monomers are monofunctional acrylate and methacrylate esters or amides and substituted derivatives thereof such as cyano, chloro, and silane derivatives as well as blends of substituted and unsubstituted monofunctional acrylate and methacrylate esters and amides. Particularly preferred monomers include lower molecular weight methacrylate esters and amides such as methyl methacrylate, ethyl methacrylate, butyl methacrylate, methoxy ethyl methacrylate, cyclohexyl methacrylate, tetrahydrofurfuryl methacrylate, N,N-dimethyl methacrylamide and blends thereof.

Acrylate esters and amides and higher molecular weight methacrylate esters and amides are less preferred for use alone, but can be especially usefully employed as modifying monomers with predominating amounts of lower molecular weight methacrylate esters and amides so as to, for example, enhance the softness or flexibility of the ultimate composition. Examples of such acrylate esters and amides and higher molecular weight methacrylate esters and amides include methyl acrylate, ethyl acrylate, isobornyl methacrylate, butyl acrylate, n-octyl acrylate, 2-ethylhexyl acrylate, 2-ethylhexyl methacrylate, decylmethacrylate, dodecyl methacrylate, tert-butyl methacrylate, acrylamide, N-methyl acrylamide, diacetone acrylamide, N-tert-butyl acrylamide, N-tert-octyl acrylamide, N-decyl methacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like. Dimethylaminoethyl acrylate and dimethylaminoethyl methacrylate may also be used as modifying agents although additional organoborane liberator may be required due to the extra amine groups.

Particularly preferred are blends of any of the lower molecular weight alkyl methacrylate esters described above with alkyl acrylates having 4 to 10 carbon atoms in the alkyl group, such as blends of methyl methacrylate and butylacrylate. Polymerizable compositions of this type may broadly comprise, based on the total weight of the composition, about 2 to 50 wt. % of the alkyl acrylate and, correspondingly, about 50 to 98 wt. % of the alkyl methacrylate.

Other useful monomers that can be used include di- or higher functional (meth)acrylates (for example, hexanedioldiacrylate, ethylene glycol dimethacrylate, ethylene glycol diacrylate, triethylene glycol dimethacrylate, polyethylene glycol diacrylate, tetraethylene glycol di(meth)acrylate, glycerol diacrylate, diethylene glycol dimethacrylate, pentaerythritol triacrylate, trimethylolpropane trimethacrylate, as well as other polyether diacrylates and dimethacrylates).

The above-discussion of acrylic monomers is not intended to be exhaustive. Other acrylic monomers are known in the art and may be used in the present invention.

The compositions may further comprise a variety of optional additives. One particularly useful additive is a thickener such as medium (about 40,000) molecular weight polybutyl methacrylate which may be incorporated in an amount of about 10 to 40 weight %, based on the total weight of the composition. Thickeners may be employed to increase the viscosity of the composition to a more easily applied viscous syrup-like consistency.

Another particularly useful additive is an elastomeric material. These materials can improve the fracture toughness of compositions made therewith which can be beneficial when, for example, bonding stiff, high yield strength materials such as metal substrates that do not mechanically absorb energy as easily as other materials, such as flexible polymeric substrates. Such additives can be incorporated in an amount of about 5% to 35% by weight, based on the total weight of the composition.

Useful elastomeric modifiers include chlorinated or chlorosulphonated polyethylenes such as HYPALON 30

(commercially available from E. I. duPont de Nemours and Co., Wilmington Del.). Also useful, and even more preferred, are certain graft copolymer resins such as particles that comprise rubber or rubber-like cores or networks that are surrounded by relatively hard shells, these materials often being referred to as "core-shell" polymers. Most preferred are the acrylonitrile-butadiene-styrene graft copolymers.

In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 20% of a core-shell polymer additive is desirable for achieving improved sag-slump resistance.

Peroxides may be optionally included (typically in an amount of about 2% by weight or less, based on the total weight of the composition), for example, to adjust the speed at which the compositions polymerize or to complete the polymerization.

Small amounts of inhibitors such as hydroquinone monomethylether may be used, for example, to prevent or reduce degradation of the acrylic monomers during storage. Inhibitors may be added in an amount that does not materially reduce the rate of polymerization or the ultimate properties of an adhesive or other composition made therewith, typically about 100–10,000 ppm based on the weight of the polymerizable monomers.

Other possible additives include non-reactive colorants, fillers (e.g., carbon black), etc. provided they are dried sufficiently to reduce moisture content below about 0.1% by weight based on the total weight of the additives.

The various optional additives are employed in an amount that does not significantly adversely affect the polymerization process or the desired properties of compositions made therewith.

Polymerizable acrylic compositions according to the invention may be used in a wide variety of ways, including as sealants, coatings, and injection molding resins. They may also be used as matrix resins in conjunction with glass and metal fiber mats such as in resin transfer molding operations. They may further be used as encapsulants and potting compounds such as in the manufacture of electrical components, printed circuit boards and the like. Quite desirably, they provide polymerizable acrylic adhesive compositions that can bond a diverse myriad of substrates, including polymers, wood, ceramics, concrete, and primed metals.

The polymerizable compositions of the invention can be easily used as two-part adhesives. The components of the polymerizable composition are blended as would normally be done when working with such materials. The decomplexer of the polymerization initiator system is usually included in this blend so as to separate it from the organoborane amine complex, thus providing one part of the two-part composition. The organoborane amine complex of the polymerization initiator system provides the second part of the composition and is added to the first part shortly before it is desired to use the composition. The complex may be added to the first part directly or it may be predissolved in an appropriate carrier such as a small amount of methyl methacrylate.

For a two-part adhesive such as those of the invention to be most easily used in commercial and industrial environments, the ratio at which the two parts are combined should be a convenient whole number. This facilitates application of the adhesive with conventional, commercially available dispensers. Such dispensers are shown in U.S. Pat. Nos. 4,538,920 and 5,082,147 and are available from Conprotec, Inc. (Salem, N.H.) under the tradename "Mixpac."

Once the two parts have been combined, the composition should be used quickly, as the useful pot life may be short depending upon the acrylic monomer mix, the amount of complex, and the temperature at which the bonding is to be performed.

The polymerizable composition is applied to one or both substrates and then the substrates are joined together with pressure to force excess composition out of the bond line. This also has the advantage of displacing composition that has been exposed to air and that may have advanced too far in cure. In general, the bonds should be made shortly after the composition has been applied, preferably within about 10 minutes. The typical bond line thickness is about 0.1 to 0.3 mm but may exceed 1.0 mm when gap filling is needed. The bonding process can easily be carried out at room temperature and to improve the degree of polymerization it is desirable to keep the temperature below about 40° C., preferably below 30° C., and most preferably below about 25° C.

The bonds will cure to a reasonable green strength to permit handling of the bonded components within about 1 hour. Full strength will be reached in about 24 hours under ambient conditions; post-curing with heat (typically about 80° C.) may be used if desired.

The invention will be more fully appreciated with reference to the following nonlimiting examples in which (unless noted otherwise) all weights are given as weight percents (weight %), based on the total weight of the composition which is 100 weight %.

EXAMPLES

Bond Strength Test Method

The adhesive compositions described below were tested for bond strength. The base component of a given adhesive formulation (comprising a thorough mixture of thickened monomers and decomplexer) was combined with the organoborane polyamine complex (referred to as the accelerator component) and mixed with a spatula for one minute. The adhesive was then applied to a 2 inch (5.1 cm) wide, 6 inch long (15.2 cm), 8 mil (0.2 mm) thick film. The film was held flat using two 30 mil (0.8 mm) thick aluminum overlays, the overlays overlapping 0.5 inch (1.3 cm) along the entire length of each side of the film.

Each adhesive formulation was tested on two different film substrates, skived polytetrafluoroethylene (PTFE) and skived ultrahigh molecular weight polyethylene (PE). Neither of the films had any surface treatment.

Once the adhesive was applied to the first film, a second film comprising the same substrate was eased onto the adhesive using a 2.7 lb (1.2 kg) weighted glass plate. One side of the glass plate was applied to one side of the second film at an angle of about 30 degrees and then gradually lowered to a horizontal position so that the second film was applied incrementally to the first to avoid formation of bubbles in the adhesive. Sufficient adhesive was applied to the first film to provide minimum bond dimensions of 1 inch (2.5 cm) in width by 1.5 inch (3.8 cm) in length.

The bonded adherends were allowed to cure for 24 hours at room temperature (21°–25° C.). The samples were then tested for bond strength in the T-peel mode using an Instron Tensile Tester set at a crosshead speed of 4 inches/min (10.2 cm/min). Two overlapping free ends of the sample were clamped into the jaws of the Instron tester, one free end in the upper jaw and one free end in the lower jaw. The jaws were then pulled apart until at least 1 inch (2.5 cm) of adhesive was exposed or until adherend failure was observed. The average force per width during the run after the adhesive was initially exposed was recorded as the Peel Strength in pounds/inch width (piw).

The tensile strengths of PTFE and PE films were found to be 11 pounds/inch width (20N/cm width) and 25 pound/inch width (44N/cm width), respectively. Preferably, the Peel Strength values approximate the tensile strength values, indicating substrate as opposed to adhesive failure.

Solvent Resistance

Cured adhesive films were obtained by removing the thin films of cured adhesive from the adherends after the bond strength peel tests were completed. When possible, the thin film was peeled from the remaining adherend. When this was difficult, the thin film plus adherend were immersed together in tetrahydrofuran (THF) solvent, and the adhesive was later scraped off the adherend. The weight of each adhesive film was determined and is denoted as W1 below. Each adhesive was placed in a 4 ounce (118 cm$^3$) glass jar. Sufficient THF was added to the glass jar so that the contents comprised less than 5 parts by weight cured adhesive film and more than 95 parts by weight THF. The jar was capped and placed on a roll mixer for at least 24 hours at room temperature (21°–25° C.). The fluid mixture was then poured into a medium mesh conical gauze/paper paint filter (available from Foremost Co. and having a weight denoted below as W2) and thoroughly rinsed with THF. Filters were dried in an 80° C. forced air oven for one hour.

The filters were allowed to equilibrate overnight at room temperature before being weighed to give the value denoted below as W3. Adhesive percent solids were then calculated as follows:

$$\text{Percent Solids} = \frac{W3 - W2 + 0.0299}{W1} \times 100$$

It is noted that a correction factor of 0.0299 milligrams was added to W3–W2 in the equation above to account for that portion of the filter that was lost by virtue of the process conditions.

Percent Gel was then calculated for samples of the invention by dividing the Percent Solids (calculated as described above) by the weight percent of the adhesive which is capable of addition polymerization. For those formulations whose Percent Solids never exceed 10%, the portion capable of addition polymerization is only the acrylic monomers. All other formulations include the portion derived from the acrylic monomers, the amine part of the complex and the decomplexer. A sample calculation is provided below for Example 30 of the invention:

$$\text{Percent Gel} = \frac{\text{Percent Solids} \times 100}{\text{Percent Capable of Addition Polymerization}}$$

Percent Gel$_{\text{Ex 30}}$ =

$$\frac{\text{Percent Solids}_{Ex\ 30} \times 100}{(\text{Wt. }\%_{MMA} + \text{Wt. }\%_{BMA} + \text{Wt. }\%_{MA} = \text{Wt }\%_{DC} + \text{Wt }\%_{AmC})}$$

where Wt. $\%_{MMA}$ is the weight percent of methyl methacrylate, Wt. $\%_{BMA}$ is the weight percent of butyl methacrylate, Wt. $\%_{MA}$ is the weight percent of methyl acrylate, Wt. $\%_{DC}$ is the weight percent of decomplexer, and Wt. $\%_{AmC}$ is the weight percent of the amine portion of the decomplexer used in Example 30. The Percent Solids of Example 30 can be found in Table VI to be 64.4. Example 30 comprised Initiator In-1 given in Table IV. The organoborane portion (triethylborane) has a molecular weight of 98, while the amine portion (1,6-hexanediamine) has a molecular weight of 116. Table VI indicates that the weight percent of initiator was 2.791. Thus the value of the Wt. $\%_{AmC}$ can be calculated as follows:

$$\text{Wt. }\%_{AmC} = (2.791) \frac{(116)}{(312)}$$

$$\text{Wt. }\%_{AmC} = 1.038$$

The percent Gel$_{Ex\ 30}$ can now be calculated from the other weight percents listed in Table VI as follows:

$$\text{Percent Gel}_{Ex30} = \frac{64.4 \times 100}{15.223 + 23.786 + 23.786 + 2.067 + 0.796}$$

$$\text{Percent Gel}_{Ex30} = 97.7\%$$

Small deviations from table values are due to rounding of Percent Solids values.

Decomplexers

Anhydride Decomplexers

Anhydride decomplexers of the present invention include those commercially available compounds as listed as decomplexers A–M in Table I:

TABLE I

Anhydride Decomplexers

| Decomplexer | Name | Source |
|---|---|---|
| A | Maleic Anhydride | Aldrich Chemical Co. |
| B | Itaconic Anhydride | Aldrich Chemical Co. |
| C | Phthalic Anhydride | Aldrich Chemical Co. |
| D | cis-1,2,3,6-Tetrahydrophthalic Anhydride | Aldrich Chemical Co. |
| E | cis-1,2-Cyclohexanedicarboxylic Anhydride | Aldrich Chemical Co. |
| F | Isobutenylsuccinic Anhydride (K-4) | Zeeland Chemicals |
| G | Methacrylic Anhydride | Aldrich Chemical Co. |
| H | Isobutyric Anhydride | Aldrich Chemical Co. |
| I | Methyl Hexahydrophthalic Anhydride (MHHPA) | Milliken Chemical Co. |
| J | Methyl-5-norbornene-2,3-dicarboxylic Anhydride | Aldrich Chemical Co. |
| K | 2-Octen-1-ylsuccinic Anhydride | Aldrich Chemical Co. |
| L | Milldride 5060 Anhydride | Milliken Chemical Co. |
| M | SMA-3000A Anhydride | Atochem Inc. |

Preparation of Anhydride Partial Adducts

Partial adducts of poly(styrene-co-maleic anhydride) were prepared for use as decomplexers. A 50 ml glass vial was charged with 2,6-di-t-butyl-4-methylphenol (BHT) inhibitor according to the weight ratios specified in Table II. This charge was followed with charges of dried hydroxyethyl acrylate (HEA); butyl methacrylate (BMA) solvent; and poly(styrene-co-maleic anhydride) (SMA-3000A, available from Atochem Inc.), according to the weight ratios specified in Table II. The HEA had been dried over a bed of 4 Å molecular sieves prior to charging.

The glass vial was sealed, shaken to mix the contents, and placed in a 105° C. circulating hot air oven. After reaching a temperature of 105° C., the contents were thoroughly remixed by shaking and returned to the oven. The glass vial remained in the oven for a 10–12 hour heating cycle, during which the glass vial was shaken periodically. The anhydride adduct decomplexers included in the present invention are designated as decomplexers N–Q in Table II.

TABLE II

Anhydride Adduct Decomplexers

| Decomplexer | Wt. % BHT | Wt. % HEA | Wt % BMA | Wt. % SMA |
|---|---|---|---|---|
| N | 0.03 | 3.00 | 49.98 | 46.99 |
| O | 0.03 | 4.89 | 49.98 | 45.10 |
| P | 0.03 | 5.65 | 49.99 | 44.33 |
| Q | 0.03 | 8.03 | 49.98 | 41.96 |

Comparative Decomplexer

For comparative purposes, methacrylic acid (available from Aldrich Chemical Co.) was used as a decomplexer in the following examples and has been designated as decomplexer R in Table III.

TABLE III

Comparative Decomplexer

| Decomplexer | Name | Source |
|---|---|---|
| R | Methacrylic Acid | Aldrich Chemical Co. |

Initiators

The organoborane amine complex initiators used in the present invention are listed in Table IV below. All were prepared with triethyl borane using a 1:1 boron to nitrogen ratio with the exception of the E-L-E type which used a boron to nitrogen ratio of 0.9:1. The organoborane polyamine complexes may be readily prepared using known techniques. Typically, the polyamine is combined with the organoborane in an inert atmosphere with slow stirring. An exotherm is often observed and cooling of the mixture is therefore recommended. If the ingredients have a high vapor pressure, it is desirable to keep the reaction temperature below about 70° to 80° C. Once the materials have been well mixed the complex is permitted to cool to room temperature. No special storage conditions are required although it is preferred that the complex be kept in a capped vessel in a cool, dark location. Advantageously, the complexes can be prepared in the absence of organic solvents that would later have to be removed, although they could be prepared in solvent if so desired. Solvents used in the preparation of the complexes should, preferably be ones that do not coordinate amines, for example, tetrahydofuran or hexane.

TABLE IV

Organoborane Amine Complex Initiators

| Initiator | Organoborane | Amine |
|---|---|---|
| In-1 | Triethylborane | 1,6-Hexanediamine |
| In-2 | Triethylborane | Jeffamine ED-600 diamine[1] |
| In-3 | Triethylborane | Jeffamine T-403 triamine[2] |
| In-4 | Triethylborane | E-L-E diamine I[2a] |
| In-5 | Triethylborane | E-L-E diamine II[2b] |

[1] Available from Huntsman Corp.
[2] 2:1 Molar adduct of Dixie Chemical Co. DCA-221 diamine and:
a = 1,6-hexanediol diacrylate
b = Shell Chemical Co. Epon 828

Adhesive Compositions (Examples 1–38 and Comparative Examples 39–41)

Two part adhesive compositions were prepared according to Table V below. The weight percent of each component based upon total composition weight is shown in this table.

The two part adhesives of this invention comprise an accelerator component and a base component. The accelerator component in all examples was solely the organoborane amine complex initiator.

The base component comprised a thickened acrylic monomer mixture to which has been added an effective amount of decomplexer. The thickened monomer mixture comprises a 16:25:25:34 blend by weight of methyl methacrylate (MMA), butyl acrylate (BA), methyl acrylate (MA) and poly(butyl methacrylate) (PBMA), respectively. The thickened monomer mixture components are all available from Aldrich Chemical Co.

Unless otherwise indicated, the standard formulation provided 3.0 moles of triethylborane for every 100 moles of free-radically polymerizable (meth)acrylate ester vinyl groups and an index of 0.75 moles of amine reactive anhydride groups for each mole of initiator amine groups.

TABLE V

Adhesive Compositions

| Example | Wt. % MMA | Wt. % BMA | Wt. % MA | Wt. % PBMA | Decomplexer | Decomplexer Wt % | Initiator | Initiator Wt. % | Borane[1] | Index[2] |
|---|---|---|---|---|---|---|---|---|---|---|
| 1 | 15.235 | 23.805 | 23.805 | 32.374 | C | 1.988 | In-1 | 2.793 | 3.0 | 0.75 |
| 2 | 15.227 | 23.792 | 23.792 | 32.357 | D | 2.040 | In-1 | 2.792 | 3.0 | 0.75 |
| 3 | 15.223 | 23.786 | 23.786 | 32.347 | E | 2.067 | In-1 | 2.791 | 3.0 | 0.75 |
| 4 | 15.215 | 23.773 | 23.773 | 32.331 | H | 2.119 | In-1 | 2.789 | 3.0 | 0.75 |
| 5 | 15.292 | 23.894 | 23.894 | 32.496 | I | 1.621 | In-1 | 2.803 | 3.0 | 0.55 |
| 6 | 15.092 | 23.581 | 23.581 | 32.070 | I | 2.909 | In-1 | 2.767 | 3.0 | 1.00 |
| 7 | 15.440 | 24.125 | 24.125 | 32.808 | J | 1.615 | In-1 | 1.887 | 2.0 | 0.75 |
| 8 | 15.174 | 23.709 | 23.709 | 32.245 | J | 2.381 | In-1 | 2.782 | 3.0 | 0.75 |
| 9 | 15.109 | 23.609 | 23.609 | 32.107 | K | 2.796 | In-1 | 2.770 | 3.0 | 0.75 |
| 10 | 15.245 | 23.821 | 23.821 | 32.396 | L | 1.922 | In-1 | 2.795 | 3.0 | 0.75 |
| 11 | 15.148 | 23.669 | 23.669 | 32.190 | L | 2.546 | In-1 | 2.778 | 3.0 | 1.00 |
| 12 | 15.293 | 23.895 | 23.895 | 32.498 | M | 2.550 | In-1 | 1.869 | 2.0 | 0.55 |
| 13 | 15.152 | 23.675 | 23.675 | 32.200 | M | 3.446 | In-1 | 1.852 | 2.0 | 0.75 |
| 14 | 14.761 | 23.065 | 23.065 | 31.367 | M | 5.035 | In-1 | 2.707 | 3.0 | 0.75 |
| 15 | 13.618 | 21.278 | 21.278 | 28.937 | M | 12.393 | In-1 | 2.496 | 3.0 | 2.00 |
| 16 | 12.504 | 19.537 | 19.537 | 26.570 | M | 14.214 | In-1 | 7.638 | 10.0 | 0.75 |
| 17 | 15.338 | 23.966 | 23.966 | 32.593 | A | 1.325 | In-1 | 2.812 | 3.0 | 0.75 |
| 18 | 15.533 | 24.270 | 24.270 | 33.007 | B | 1.022 | In-1 | 1.898 | 2.0 | 0.75 |
| 19 | 15.371 | 24.017 | 24.017 | 32.664 | B | 1.113 | In-1 | 2.818 | 3.0 | 0.55 |
| 20 | 15.309 | 23.920 | 23.920 | 32.533 | B | 1.511 | In-1 | 2.807 | 3.0 | 0.75 |
| 21 | 15.232 | 23.800 | 23.800 | 32.370 | B | 2.005 | In-1 | 2.793 | 3.0 | 1.00 |

TABLE V-continued

Adhesive Compositions

| Example | Wt. % MMA | Wt. % BMA | Wt. % MA | Wt. % PBMA | Decomplexer | Decomplexer Wt % | Initiator | Initiator Wt. % | Borane[1] | Index[2] |
|---|---|---|---|---|---|---|---|---|---|---|
| 22 | 15.601 | 24.378 | 24.378 | 33.154 | F | 1.059 | In-1 | 1.430 | 1.5 | 0.75 |
| 23 | 15.223 | 23.786 | 23.786 | 32.347 | F | 2.067 | In-1 | 2.791 | 3.0 | 0.75 |
| 24 | 15.732 | 24.582 | 24.582 | 33.430 | G | 0.712 | In-1 | 0.962 | 1.0 | 0.75 |
| 25 | 15.646 | 24.447 | 24.447 | 33.247 | G | 0.779 | In-1 | 1.434 | 1.5 | 0.55 |
| 26 | 15.601 | 24.378 | 24.378 | 33.154 | G | 1.059 | In-1 | 1.430 | 1.5 | 0.75 |
| 27 | 15.547 | 24.292 | 24.292 | 33.037 | G | 1.407 | In-1 | 1.425 | 1.5 | 1.00 |
| 28 | 15.473 | 24.177 | 24.177 | 32.881 | G | 1.400 | In-1 | 1.892 | 2.0 | 0.75 |
| 29 | 15.347 | 23.980 | 23.980 | 32.612 | G | 1.736 | In-1 | 2.345 | 2.5 | 0.75 |
| 30 | 15.223 | 23.786 | 23.786 | 32.347 | G | 2.067 | In-1 | 2.791 | 3.0 | 0.75 |
| 31 | 14.541 | 22.721 | 22.721 | 30.900 | G | 1.974 | In-2 | 7.143 | 3.0 | 0.75 |
| 32 | 14.457 | 22.589 | 22.589 | 30.721 | G | 1.963 | In-4 | 7.680 | 3.0 | 0.75 |
| 33 | 14.276 | 22.307 | 22.307 | 30.337 | G | 1.938 | In-5 | 8.834 | 3.0 | 0.75 |
| 34 | 14.939 | 23.343 | 23.343 | 31.746 | G | 2.028 | In-3 | 4.600 | 3.0 | 0.75 |
| 35 | 13.399 | 27.715 | 20.936 | 28.473 | N | 6.779 | In-1 | 2.696 | 3.0 | 0.75 |
| 36 | 12.815 | 28.643 | 20.024 | 27.232 | O | 8.619 | In-1 | 2.668 | 3.0 | 0.75 |
| 37 | 12.480 | 29.175 | 19.500 | 26.520 | P | 9.675 | In-1 | 2.650 | 3.0 | 0.75 |
| 38 | 10.583 | 32.188 | 16.535 | 22.488 | Q | 15.653 | In-1 | 2.554 | 3.0 | 0.75 |
| Comp 39 | 15.280 | 23.875 | 23.875 | 32.470 | R | 1.699 | In-1 | 2.801 | 3.0 | 1.10 |
| Comp 40 | 15.186 | 23.728 | 23.728 | 32.271 | R | 2.302 | In-1 | 2.784 | 3.0 | 1.50 |
| Comp 41 | 15.070 | 23.548 | 23.548 | 32.025 | R | 3.046 | In-4 | 2.763 | 3.0 | 2.00 |

[1] Moles of triethylborane/100 moles of (meth)acrylate ester vinyl groups
[2] Moles of methacrylic acid or anhydride groups/mole of initiator amine groups

TABLE VI

Bond Strength and Solvent Resistance

| Example | Decomplexer | Bond Strength PTFE piw | N/cm | Bond Strength PE piw | N/cm | Free Film Solvent Resistance % Solids | % Gel |
|---|---|---|---|---|---|---|---|
| 1 | C | 33[1] | 58[1] | <1 | <1 | 0.7 | 1.2 |
| 2 | D | 30[1] | 53[1] | 2 | 4 | 1.5 | 2.2 |
| 3 | E | 25[1] | 44[1] | <1 | 1 | 1.4 | 2.2 |
| 4 | H | 25 | 44 | 3 | 5 | 1.1 | 1.7 |
| 5 | I | 24[1] | 42[1] | 1 | 2 | 1.2 | 2.0 |
| 6 | I | 16[1] | 28[1] | <1 | <1 | 1.4 | 2.2 |
| 7 | J | 24[1] | 42[1] | 8 | 14 | 1.1 | 1.7 |
| 8 | J | 31[1] | 54[1] | 7 | 12 | 1.2 | 1.8 |
| 9 | K | 24[1] | 42[1] | 1 | 2 | 0.9 | 1.4 |
| 10 | L | 11 | 20 | 9 | 16 | 1.2 | 1.8 |
| 11 | L | 15 | 26 | 8 | 13 | 0.8 | 1.2 |
| 12 | M | 6 | 11 | 22 | 39 | ND | ND |
| 13 | M | 13 | 22 | 21 | 37 | ND | ND |
| 14 | M | 12 | 21 | 16 | 27 | 2.4 | 4.0 |
| 15 | M | 11 | 19 | 16 | 28 | ND | ND |
| 16 | M | 11 | 20 | 6[1] | 11[1] | ND | ND |
| 17 | A | 29[1] | 51[1] | <1 | <1 | 35.2 | 53.6 |
| 18 | B | 24[1] | 42[1] | 5 | 9 | 44.0 | 66.8 |
| 19 | B | 19[1] | 33[1] | 7 | 12 | 28.7 | 43.8 |
| 20 | B | 17[1] | 29[1] | 5 | 9 | 61.4 | 93.5 |
| 21 | B | 13 | 23 | 2 | 3 | 50.4 | 76.5 |
| 22 | F | 21[1] | 37[1] | 11[1] | 18[1] | 41.0 | 62.1 |
| 23 | F | 32[1] | 56[1] | 2 | 4 | 43.9 | 66.6 |
| 24 | G | <1 | 1 | 16 | 27 | 57.8 | 87.7 |
| 25 | G | 8 | 15 | 19[1] | 33(1) | 59.1 | 89.7 |
| 26 | G | 13 | 23 | 8 | 14 | 57.6 | 87.4 |
| 27 | G | 16[1] | 28[1] | 7 | 13 | 63.0 | 95.3 |
| 28 | G | 18[1] | 31[1] | 3 | 5 | 60.8 | 92.2 |
| 29 | G | 19[1] | 32[1] | <1 | <1 | 61.5 | 93.3 |
| 30 | G | 21[1] | 37[1] | 1 | 2 | 64.4 | 97.7 |
| 31 | G | 28[1] | 49[1] | 7 | 12 | 60.1 | 89.1 |
| 32 | G | 30[1] | 53[1] | 22[1] | 39[1] | 60.1 | 89.1 |
| 33 | G | 10 | 18 | 23 | 40 | 54.5 | 80.3 |
| 34 | G | 25[1] | 44[1] | <1 | <1 | 62.8 | 94.3 |
| 35 | N | 12 | 20 | 14 | 24 | 14.0 | 20.1 |
| 36 | O | 8 | 15 | 10 | 18 | 31.2 | 43.8 |
| 37 | P | 9 | 16 | 10 | 18 | 36.7 | 51.1 |
| 38 | Q | 5 | 9 | 5 | 9 | 48.9 | 64.5 |
| Comp 39 | R | 7 | 12 | 4[1] | 6[1] | 1.3 | 2.0 |
| Comp 40 | R | 9 | 16 | 4[1] | 6[1] | 2.0 | 3.1 |
| Comp 41 | R | 11[2] | 19[2] | 6[3] | 10[3] | 0.4 | 0.6 |

ND = Not determined
[1] Adherend tore
[2] 1 inch (2.5 cm) wide adherend
[3] 15 mil (0.4 mm) thick PE used Each bond strength value in Table VI is the average reading in pounds per inch width (piw) or Newtons per centimeter (N/cm) over the length of the bond which was pulled. In general, preferred bond strengths are at least 5 piw (9 N/cm). The data in Table VI indicate good to outstanding bond formation for all of the formulations on either PE and PTFE, and for many formulations on both PE and PTFE.

The data of Table VI also show that decomplexers of the present invention can advantageously provide both a reduced level of mobile constituents and improved solvent resistance compared to the comparative decomplexer (methacrylic acid). More specifically, Examples 17–38 provided % Solid values in the range of 14 to 64 and % Gel values in the range of 20 to 98, while the Comparative Examples 39–41 provided % Solid values in the range of 0.4–2.0 and % Gel values in the range of 0.6–3.1.

It is noted that the decomplexers of Examples 17–38 comprised free radically polymerizable groups (namely, 1,1-disubstituted alkenes and 1,2-disubstituted alkenes which are part of an α, β-unsaturated carbonyl structure). Such decomplexers are capable of covalently bonding with the polyamine portion of the organoborane amine complex to form decomplexer-amine reaction products comprising more than one free radically polymerizable group. As a consequence, these decomplexers provide adhesive compositions having both a reduced level of mobile consituents and good solvent resistance. Such decomplexers are preferred for the present invention.

It is further noted that the decomplexer of Comparative Examples 39–41 (methacrylic acid) comprised a 1,1-disubstituted alkene group which is capable of ionically (as opposed to covalently) bonding with the polyamine portion of the organoborane amine complex. As a consequence, this decomplexer was unable to provide solvent resistance.

Other observations from the data of Table VI include the following: Examples 24–29 illustrate that the initiator and anhydride concentrations can be independently varied to optimize adhesive bond strengths without adversely affecting solvent resistance. Examples 30–34 illustrate that a variety organoborane amine complexes may be utilized with the decomplexers of the invention to provide excellent adhesive bond strength values and solvent resistance.

Various modifications and alterations of this invention will become apparent to those skilled in the art without departing from the scope and spirit of the invention. It should be understood that this invention is not limited to the illustrative embodiments set forth herein.

The embodiments for which an exclusive property or privilege is claimed are defined as follows:

1. An initiator system capable of initiating the polymerization of acrylic monomers comprising (1) an organoborane amine complex and (2) a decomplexer comprising at least one anhydride group and at least one free radically polymerizable group.

2. An initiator system capable of initiating the polymerization of acrylic monomers comprising (1) an organoborane amine complex and (2) a decomplexer having a cyclic structure and comprising at least one anhydride group.

3. A polymerizable acrylic composition comprising:
   a) at least one acrylic monomer;
   b) an effective amount of an organoborane amine complex; and
   c) an effective amount of a decomplexer having a cyclic structure and comprising at least one anhydride group, said decomplexer being reactive with said amine to liberate the organoborane to initiate polymerization of at least one acrylic monomer.

4. An initiator system according to claim 1 wherein said organoborane amine complex comprises at least two amine groups.

5. An initiator system according to claim 1 wherein said decomplexer has the structure:

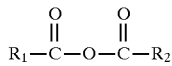

wherein each $R_1$ and $R_2$ are independently selected from the group consisting of aliphatic, cycloaliphatic and aromatic groups.

6. An initiator system according to claim 5 wherein at least one of the $R_1$ and $R_2$ groups comprises a group selected from the group consisting of monosubstituted alkene groups, 1,1-disubstituted alkene groups, and 1,2-disubstituted alkene groups which are part of an α,β-unsaturated carbonyl structure.

7. An initiator system according to claim 2 wherein said decomplexer has the following structure:

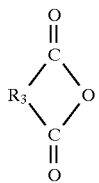

wherein $R_3$ is a divalent organic radical.

8. An initiator system according to claim 7 wherein $R_3$ comprises a group selected from the group consisting of monosubstituted alkene groups, 1,1-disubstituted alkene groups, and 1,2-disubstituted alkene groups which are part of an α,β-unsaturated carbonyl structure.

9. An initiator system according to claim 7 wherein said cyclic structure comprises the reaction product of an active hydrogen containing compound and a polyanhydride.

10. An initiator system according to claim 9 wherein said active hydrogen containing compound has the following structure:

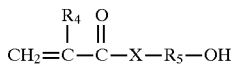

wherein $R_4$ is selected from the group consisting of hydrogen, methyl, ethyl and chlorine; $R_5$ is selected from the group consisting of alkyl groups; and X is selected from the group consisting of oxygen and $NR_6$ wherein $R_6$ is selected from the group consisting of hydrogen and alkyl groups.

11. An initiator system according to claim 10 wherein $R_4$ is selected from the group consisting of hydrogen and methyl; $R_5$ is selected from the group consisting of alkyl groups having 2 to 4 carbon atoms; and X is oxygen.

12. An initiator system according to claim 9 wherein said active hydrogen containing compound-has the following structure:

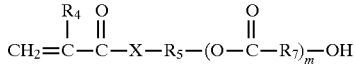

wherein $R_1$ is selected from the group consisting of hydrogen, methyl, ethyl and chlorine; each $R_2$ and $R_4$ are independently selected from the group consisting of alkyl groups; X is selected from the group consisting of oxygen and $NR_6$ wherein $R_6$ is selected from the group consisting of hydrogen and alkyl groups; and m is an integer greater than or equal to 1.

13. An initiator system according to claim 12 wherein $R_4$ is selected from the group consisting of hydrogen and methyl; $R_5$ is selected from the group consisting of alkyl groups having 2 to 4 carbon atoms; X is oxygen; $R_7$ is selected from the group consisting of alkyl groups having 3 to 5 carbon atoms; and m is an integer greater from 1 to 4.

14. An initiator system according to claim 1 wherein said decomplexer is selected from the group consisting of methacrylic anhydride, itaconic anhydride, maleic anhydride and isobutenyl succinic anhydride.

15. An initiator system according to claim 1 wherein said organoborane amine complex comprises at least two amine groups.

16. An initiator system according to claim 1 wherein said complex has the structure:

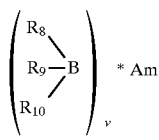

wherein $R_8$ is selected from the group consisting of alkyl groups having 1 to 10 carbon atoms; $R_9$ and $R_{10}$ are independently selected from the group consisting of alkyl groups having 1 to 10 carbon atoms and phenyl-containing groups; the value of v is selected so as to provide a 0.5:1 to 4:1 ratio of primary or secondary amine nitrogen atoms to boron atoms in the complex; and Am is an amine.

17. An initiator system according to claim 16 wherein Am has the structure:

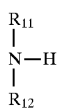

where $R_{11}$ and $R_{12}$ are independently selected from the group consisting of hydrogen, alkyl groups having 1 to 10 carbon atoms, hydroxyethyl and

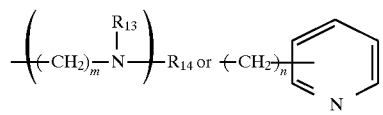

wherein $R_{13}$ and $R_{14}$ are independently selected from the group consisting of hydrogen and alkyl groups having 1 to 10 carbon atoms; m is an integer from 2 to 10; and n is an integer from 1 to 6.

18. An initiator system according to claim 16 wherein Am is a polyoxyalkylenepolyamine having a structure selected from the group consisting of:

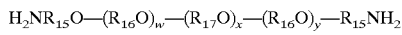

or

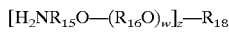

wherein $R_{15}$, $R_{16}$ and $R_{17}$ are independently selected from the group consisting of alkylene and alkyl groups; $R_{18}$ is selected from the group consisting of polyol residues; the value of w is $\geq 1$; the value of x and y are $\geq 0$; and the value of z is >2.

19. An initiator system according to claim 16 wherein Am has the structure E—(L—E)$_q$—L—E wherein each E group is independently selected from the group consisting of the residues of diprimary amine-terminated materials; each L is independently selected from the group consisting of the residues of materials having at least two groups reactive with primary amines; and q is $\geq 0$.

20. A polymerizable acrylic composition comprising:
a) at least one acrylic monomer;
b) an effective amount of an organoborane amine complex; and
c) an effective amount of a decomplexer comprising at least one anhydride group and at least one free radically polymerizable group, said decomplexer being reactive with said amine to liberate the organoborane to initiate polymerization of at least one acrylic monomer.

21. A polymerizable acrylic composition according to claim 20 wherein the at least one acrylic monomer is selected from the group consisting of monofunctional acrylate ester, monofunctional methacrylate ester, substituted derivatives of the foregoing, and blends of the foregoing.

22. A polymerizable acrylic composition according to claim 20, wherein said organoborane amine complex comprises at least two amine groups.

23. A polymerizable acrylic composition according to claim 20 wherein said decomplexer has the structure:

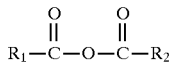

wherein each $R_1$ and $R_2$ are independently selected from the group consisting of aliphatic, cycloaliphatic and aromatic groups.

24. A polymerizable acrylic composition according to claim 23 wherein at least one of the $R_1$ and $R_2$ comprises a group selected from the group consisting of monosubstituted alkene groups, 1,1-disubstituted alkene groups, and 1,2-disubstituted alkene groups which are part of an α,β-unsaturated carbonyl structure.

25. A polymerizable acrylic composition according to claim 3 wherein said decomplexer has the following structure:

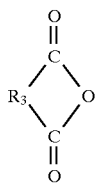

wherein $R_3$ is a divalent organic radical.

26. A polymerizable acrylic composition according to claim 25 wherein $R_3$ comprises at least one group selected from the group consisting of monosubstituted alkene groups, 1,1-disubstituted alkene groups, and 1,2-disubstituted alkene groups which are part of an α,β-unsaturated carbonyl structure.

27. A polymerizable acrylic composition according to claim 25 wherein said decomplexer comprises the reaction product of an active hydrogen containing compound and a polyanhydride.

28. A polymerizable acrylic composition according to claim 27 wherein said active hydrogen containing compound has the following structure:

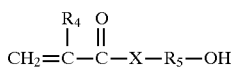

wherein $R_4$ is selected from the group consisting of hydrogen, methyl, ethyl and chlorine; $R_2$ is selected from the group consisting of alkyl groups; and X is selected from the group consisting of oxygen and $NR_6$ wherein $R_6$ is selected from the group consisting of hydrogen and alkyl groups.

29. A polymerizable acrylic composition according to claim 27 wherein said active hydrogen containing compound has the following structure:

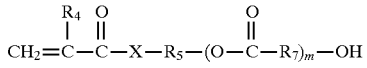

wherein $R_1$ is selected from the group consisting of hydrogen, methyl, ethyl and chlorine; each $R_2$ and $R_4$ are independently selected from the group consisting of alkyl groups; X is selected from the group consisting of oxygen and $NR_6$ wherein $R_6$ is selected from the group consisting of hydrogen and alkyl groups; and m is an integer greater than or equal to 1.

30. A polymerizable acrylic composition according to claim 20 wherein said decomplexer is selected from the group consisting of methacrylic anhydride, itaconic anhydride, maleic anhydride and isobutenyl succinic anhydride.

31. A polymerized acrylic adhesive composition according to claim 20.

32. A method of initiating a polymerization of at least one acrylic monomer, the method comprising the steps of:
   a) providing at least one acrylic monomer;
   b) blending the at least one acrylic monomer with the components of a polymerization initiator system, said system comprising;
      i) an organoborane amine complex,
      ii) an effective amount of a decomplexer comprising at least one anhydride group and at least one free radically polymerizable group, said decomplexer being reactive with amine for liberating the organoborane to initiate the polymerization of the at least one acrylic monomer; and
   c) initiating polymerization of the at least one acrylic monomer.

33. A method of increasing the solvent resistance of a polymerized acrylic adhesive composition obtained by organoborane-initiated polymerization of acrylic monomer, said method comprising the steps of
   a) providing at least one acrylic monomer;
   b) providing an organoborane amine complex comprising at least two amine groups;
   c) providing a decomplexer comprising at least one anhydride group and at least one free radically polymerizable group;
   d) blending components a), b) and c), and;
   e) initiating polymerization of the at least one acrylic monomer and continuing polymerization until a solvent resistant acrylic adhesive composition is obtained.

34. An initiator system capable of initiating the polymerization of acrylic monomers comprising (1) an organoborane amine complex, and (2) a decomplexer comprising at least one hydride group selected from the group consisting of aliphatic anhydrides having an aliphatic group comprising at least 2 carbon atoms cycloaliphatic anhydrides, cyclic anhydrides, and aromatic anhydrides.

35. An initiator system capable of initiating the polymerization of acrylic monomers comprising (1) an organoborane amine complex and (2) a decomplexer comprising at least one anhydride group capable of reacting with the amine portion of the organoborane amine complex to form a decomplexer-amine reaction product comprising a free radically polymerizable group.

36. An initiator system according to claim 35, wherein said decomplexer-amine reaction product comprises more than one free radically polymerizable group.

37. A polymerizable acrylic composition comprising:
   a) at least one acrylic monomer;
   b) an effective amount of an organoborane amine complex; and
   c) an effective amount of a decomplexer comprising at least one anhydride group, said decomplexer being reactive with said amine to liberate the organoborane to initiate polymerization of at least one acrylic monomer, said anhydride group capable of reacting with the amine portion of the organoborane amine complex to form a decomplexer-amine reaction product comprising a free radically polymerizable group.

38. A polymerizable acrylic composition of claim 37, wherein said decomplexer-amine reaction product comprises more than one free radically polymerizable group.

39. A polymerizable acrylic composition comprising:
   a) at least one acrylic monomer;
   b) an effective amount of an organoborane amine complex; and
   c) an effective amount of a decomplexer comprising at least one anhydride group selected from the group consisting of aliphatic anhydrides having a $C_2$ or greater alkyl group, cycloaliphatic anhydrides, and aromatic anhydrides, said decomplexer being reactive with said amine to liberate the organoborane to initiate polymerization of at least one acrylic monomer.

* * * * *

UNITED STATES PATENT AND TRADEMARK OFFICE
CERTIFICATE OF CORRECTION

PATENT NO. : 5,883,208
DATED : March 16, 1999
INVENTOR(S) : E. John Deviny

It is certified that error appears in the above-identified patent and that said Letters Patent is hereby corrected as shown below:

Title page,
FOREIGN PATENT DOCUMENTS, "113722" should read -- 1113722 --.

Column 10,
Line 15, "I s o b o m y l" should read -- I s o b o r n y l --.

Column 16,
Table IV, Initiator/In-3, under Amine, "triamine (2) "should read -- triamine (1) --.

Columns 17 and 18, Table V,
Example 41, under Adhesive Compositions/Initiator, "In-4" should read -- In-1 --.

Signed and Sealed this

Thirtieth Day of October, 2001

Attest:

NICHOLAS P. GODICI
Attesting Officer    Acting Director of the United States Patent and Trademark Office